INVENTOR.
Philippe Yves Marie Le Calvez
BY
Ben. J. Chromy
his attorney

Aug. 28, 1951 P. LE CALVEZ 2,566,218

TELEGRAPH SYSTEM

Filed Aug. 25, 1947 2 Sheets-Sheet 2

*INVENTOR.*
Philippe Yves Marie Le Calvez

BY *Ben. J. Chromy*
*his Attorney.*

Patented Aug. 28, 1951 2,566,218

UNITED STATES PATENT OFFICE 2,566,218

TELEGRAPH SYSTEM

Philippe Yves Marie Le Calvez, Paris, France, assignor to Societe française Sadir-Carpentier, Paris, France, a corporation of France Application August 25, 1947, Serial No. 770,416
In France April 28, 1943

Section 1, Public Law 690, August 8, 1946
Patent expires April 28, 1963

9 Claims. (Cl. 178—58)

This invention relates to wireless telegraph systems, and more particularly to duplex radio and like telegraph systems of the printing telegraph or perforated band receiver type and has for its object to provide improved telegraph systems with a very high degree of security, i. e., a very high degree of immunity from errors due to interference or like causes.

The invention preferably uses the known system of harmonic telegraphy in combination with a code which transforms the character (letter, figure or other element) to be transmitted into a group of ($n$) elemental signals, each such elemental signal being characterized by the transmission of a predetermined one of a pair of frequencies allotted to each signal, all the frequencies of the various pairs preferably, though not necessarily modulating, as in harmonic telegraphy, a common carrier wave. In the example to be given hereinafter, a 5-unit code (i. e., one in which $n=5$) is used.

As will be seen later, the invention offers the important advantage of automatically obtaining adjustment of the traffic speed according to the actual conditions of propagation. This advantage is obtained by reason of a control of the transmitter by the translator in such manner that the transmitter can only transmit a fresh signal when the previous signal transmitted has been appropriately recorded by the receiver.

In a system in accordance with the invention, a group of modulations transmitting a character is preferably transmitted in a continuous or uninterrupted manner until the arrival of a control signal sent out by the receiving station by means of an associated transmitter effecting duplex operation on another wavelength. On the arrival of this control signal, the transmitter immediately changes its modulation so as to transmit the next character. The control signal itself preferably comprises one or the other of two modulation frequencies, called control frequencies, of the wave radiated by the associated transmitter, each of said two control frequencies being used in turn.

Furthermore, the transmitting station receives an additional modulation, independently of those used for the character to be transmitted, by means of one or the other of two frequencies, called starting frequencies or identification frequencies, and serving to differentiate each character successively transmitted. Like the others, this starting frequency is continuously transmitted and suddenly changes as soon as the transmitting station has received the control signal which is manifested by the change of control frequency affecting the receiver which is associated with it for duplex operation. It will therefore be seen that finally, owing to the duplex coupling, each transmitter is modulated by the signalling, control and starting frequencies. All of these frequencies may be transmitted in any convenient appropriate manner, e. g., by normal amplitude or single side band modulation, frequency modulation, phase modulation and so on.

I will now describe one channel of a duplex transmission system in accordance with the invention. It is to be understood that the other channel operates in a similar manner.

In this system:

($a$) Each signal transmitted comprises a combination of $n$ frequencies each belonging to a group of two frequencies, while the receiving apparatus comprises $n$ groups of two relays arranged in such manner that each frequency transmitted causes the energization of one and only one relay in the corresponding group.

($b$) When one and only one relay is energized in each of the $n$ groups, the signal transmitted is recorded and a control frequency is sent to the transmitter which has remained locked since the preceding transmission in order to cause the next signal to be transmitted.

A general system as above described would still have the drawback that general fading causing the same combination or the same control signal to disappear and then reappear, might either cause repetition of the same letter or signal in the receiver, or cause a fresh combination to be prematurely transmitted. In order to avoid this difficulty the invention provides that:

(1) Each combination of $n$ frequencies is accompanied by another identification frequency, called the starting frequency, which is not the same for any given signal transmission and for the next transmission, two frequencies alternately fulfilling this function.

(2) The control frequency is similarly changed after each recording of a combination in the receiver, two frequencies being used alternately for this purpose.

(3) As for the reception of signalling frequencies, the reception of the identification frequencies and of the control frequencies is effected by a group of two relays arranged in such a manner that each frequency transmitted produces the energization of one and only one relay, the armatures of said relays controlling a starting circuit, either for transmission (at the transmitter), or for recording (at the receiver), which circuit is only energized when one and only one of said relays is operative.

It will be seen that a system as above described will automatically adjust its own transmission speed according to the prevailing conditions of propagation. On the other hand, the direction of the traffic depends entirely on the "receiving" position which can adjust the delay of sending back the control frequency, and even stop such sending back, and thereby stop the transmission. Finally, the reliability with which each signal is received makes it possible, by means of rotary switches which move forward by one step after each signal, to multiply the communication in an almost unlimited manner.

The invention includes within its scope all embodiments of systems as above described, and in particular those showing one or more of the following features:

(*a*) The transmitters and the translators are respectively connected in parallel with the various levels of a rotary switch.

This expedient is well known per se its purpose being to use the full capacity of a wireless channel by transmitting in turn the characters of different messages.

(*b*) The rotary switches have a shaft which is connected by a sliding clutch to a continuous rotating driving shaft, but are retained by an escapement wheel, the pawl or equivalent device of which is actuated by a relay in such manner that each oscillation of the pawl or the like feeds the rotary switch one step forwards.

(*c*) Successive energizations of the starting circuit of the transmitting apparatus alternately change the polarity of the signal transmitted to a control line.

(*d*) The starting circuit is broken during the operation of the rotary switch.

(*e*) The starting circuit includes a polarised relay, the armature of which alternately transmits a predetermined polarity to two fixed contacts respectively connected to the even and odd contacts of a ring of contacts on the rotary switch, while the brush or wiper arm of said ring of contacts is connected to a hold-on relay connected to a point of opposite polarity, said hold-on relay having a dead contact in the starting circuit.

At the transmitting end—

(*f*) The combinations to be transmitted are each recorded alternately by one or other of the relays of a group of two relays, the switching from one of the relays to the other taking place at each reversal of polarity of the control line.

(*g*) The relay of the group which is not in the recording position is placed in the transmitting position, the registering of the next combination being thus effected during the transmission of the previous combination, while the switching of the transmitting circuit from one relay to the other is also effected at each reversal of polarity of the control line.

(*h*) The two windings of the two relays of the same recording group are arranged in parallel and connected to the fixed contacts of a polarised relay which is connected to the control line and the armature of which is connected to a wiper arm of the rotary switch belonging to one of the contact rings to the contacts of which the transmitters are connected in parallel.

(*i*) The armatures of the two relays of the same recording group are connected to the fixed contacts of a polarised relay which is connected to the control line and the armature of which is connected to a control circuit of the transmission of one or other of two signalling frequencies, whereas the fixed contacts of said relays are respectively given two opposite polarities.

(*j*) The control circuit of the identification transmission is connected to the control line.

(*k*) The pawl or the like escapement member of the rotary switch is actuated by a polarised relay connected to the control line.

(*l*) The rotary switch is provided with a special ring of contacts for actuating the relays controlling the electromagnets for moving the transmitters to the next level, so that after having operated, said transmitters may prepare the next combination.

At the receiving end—

(*m*) The armatures of the two relays of each receiving group control a receiving circuit which is only energized when one only of said relays is operative, the direction of the current being different according as to whether one or the other of the two relays is operative.

(*n*) The receiving circuit of each group contains the winding of a polarised relay, the armature of which is connected to one of the recording wiper arms of the rotary switch, and imparts to said arm one polarity or the other according to the direction of energization of said relay.

(*o*) The recording circuit of each group imparts, when it is energized, a predetermined polarity to the winding of a chain relay which is connected to the wiper arm of the hold-on relay and is provided with a hold-on circuit including a dead contact of an end relay.

(*p*) The successive energizations of the starting circuit of the receiving apparatus alternately change the polarity imparted to a control line, the other end of which is grounded through the chain contacts, in such a manner that a current only passes through said line when all the chain contacts have been closed.

(*q*) The control line contains in parallel a polarised relay, the energization of which in one direction or the other determines the sending towards the transmitter of one or the other of the control frequencies according to the direction of its energization, and an unpolarised relay, the energization of which produces the recording of the combination received.

(*r*) The recording of the unpolarised relay produces the energization of an end relay which is provided with a hold-on circuit connected to that of the hold-on relay by an operative contact.

(*s*) The energization of the end relay completes the energization circuit of a polarised relay connected to the control line, said polarised relay determining by its energization in one direction or the other that of the electromagnet controlling the rotary switch.

(*t*) The rotary switch has a special ring of contacts for controlling relays which start on the next level the energization of the reading electromagnet of the translating device.

(*u*) A switch arranged in the circuit for sending back the control frequency either prevents this sending back or operates step by step.

Accompanying drawings show, by way of example only, one embodiment of the invention. In the drawings.

In the present state of telegraph technique, it is advantageous to use harmonic telegraphy systems both at the transmitting end and at the receiving end; copper oxide modulators are particularly advantageous in this case owing to their practically zero time constants as compared to the duration of operation of a relay.

The automatic transmitters and the translating devices to be used may be of any type. In this example, in which it is assumed that the 5-unit Baudot code is employed, it is only necessary for them to be capable of transmitting or registering 5 code signals simultaneously. In order to give a specific example, the frequencies may be numbered from 1 to 10, the even numbered frequencies corresponding to the + sign and the odd numbered frequencies to the − sign. The transmitters are modulated at telephone frequency by these combinations of frequencies.

The rotary switches are preferably, as shown, of the pawl-escapement type driven by a friction clutch. The optimum number of levels is twelve, since this number enables the greatest number of combinations to be obtained and 1, 2, 3, 4, 6 or 12 channels to be obtained on the same communication means by simply connecting the transmitters and the translating devices in parallel.

The contruction of the apparatuses shown will be described at the same time as their operation, in order to avoid useless repetitions. It is to be noted that the armatures of the relays are shown throughout in their inoperative positions.

Figure 1:
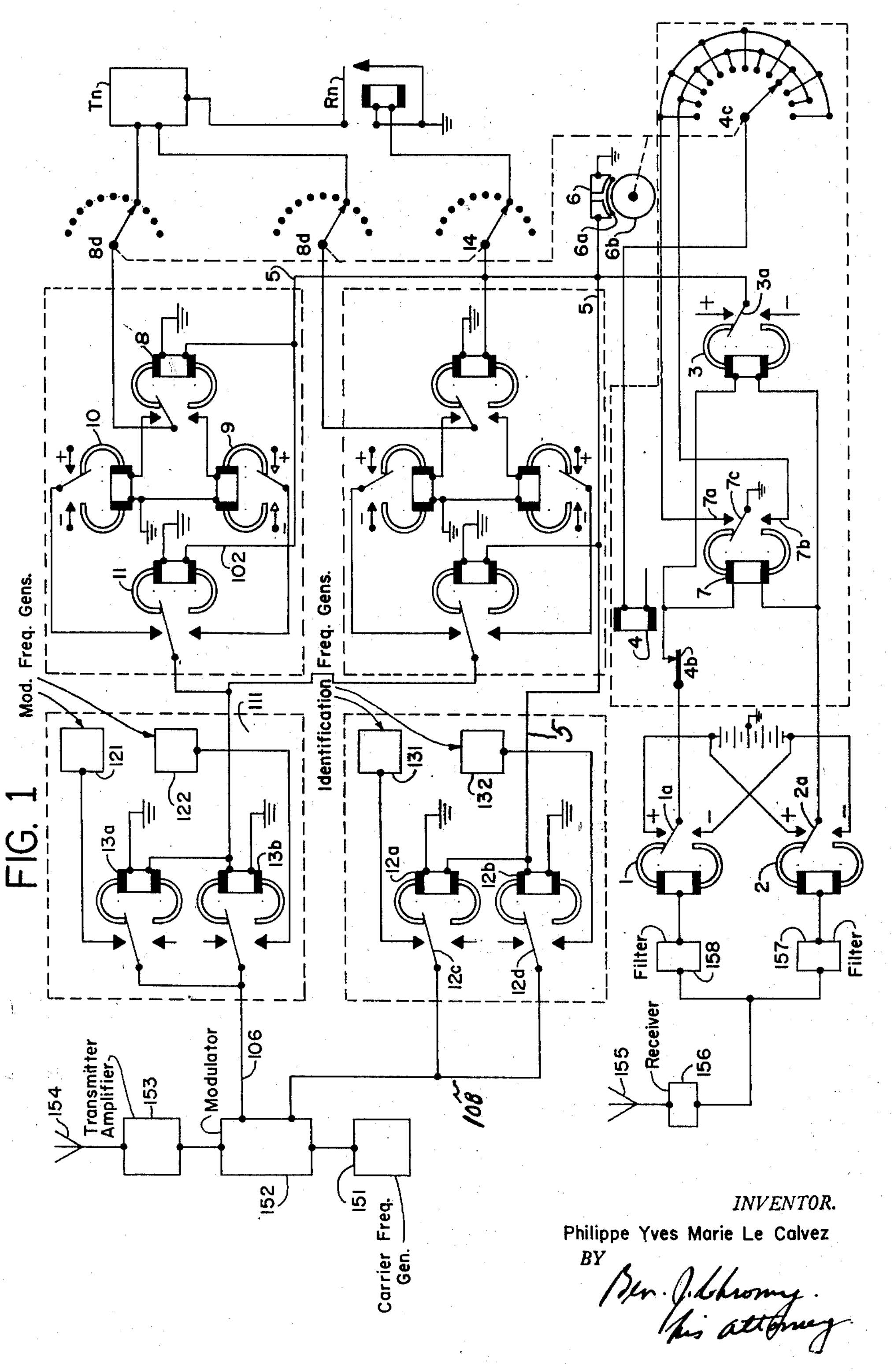
Fig. 1 is a schematic diagram of the transmitting station.

*Transmission* (*Fig. 1*)

Referring to Fig. 1 of the drawing in detail there is illustrated a schematic diagram of connections of a transmitting station including a control signal receiver. This signal receiver employs an antenna 155 connected to the receiver 156 comprising an amplifier and detector for receiving and detecting the return control signal which is fed from the output of the apparatus 156 over the conductor 160 to the two filters 157 and 158. The outputs of the filters 157 and 158 are connected to the relays 1 and 2, respectively.

It can thus be seen that, depending upon whether the received control signal is constituted by one or the other of the modulation frequencies, only the corresponding filter 157 or 158 will feed a signal to the corresponding relay 1 or 2.

It will be assumed that transmission has already begun and that a combination has already been transmitted. As explained, the next combination can only be transmitted when the control frequency has been received at the transmitting station. At this instant, one and only one of the two polarised relays 1 or 2 controlling the relay 3 is excited. It will be assumed for example that it is the relay 1.

The armature of the relay 1 moves into its operative position, which has the effect of energizing the telegraph relay 3, which is adjusted neutrally, through the following circuit: the plus terminal of the battery 159, armature 1*a* (operative), dead contact 4*a* of the relay 4 (which will be described hereinafter), armature 4*b* of said relay 4 (inoperative) windings of the relay 3, armature 2*a* of the relay 2 (inoperative) to the minus terminal of the battery 159. Owing to its excitation, the relay 3 moves its armature 3*a* from one position to the other, and connects the control line 5 connected to the armature 3*a* to the negative terminal assuming that it was previously connected to the positive terminal or conversely.

It will be understood that at the next control signal transmission received by the receiver 156, the relay 2 will be energized through the filter 158, which will have the effect, similarly of energizing the relay 3 but with a current of opposite direction, which will have the effect of connecting the control line 5 to the plus terminal of the battery through the armature 3*a*, since it was previously connected to the negative terminal.

The system of the two relays 1 and 2 is thus characterized by the fact that the two armatures 1*a* and 2*a*, which are respectively connected to the windings of the relay 3, are in contact when inoperative with stationary contacts which are connected to the same pole and, when operative they are in contact with stationary contacts of opposite polarity; the whole arrangement being such that if one only of the two relays 1 or 2 is energized, the relay 3 is energized in a predetermined direction which depends solely on which of the two relays 1 or 2 is energized, whereas if said two relays 1 and 2 are both inoperative or operative, the relay 3 is not energized. It will be seen, furthermore, that the armature 3*a* will not change its position if the same relay 1 or 2 were to be energized twice in succession. It will therefore be seen that this armature 3*a* will not change its position either as a result of static, or of fading.

The change of polarity thus effected on the control line 5 by the reception of a control frequency has various effects:

A first effect is to produce energization of the electromagnet 6 for releasing a rotary switch driven by a continuously rotating drive shaft through a clutch, but normally stopped by the pawl 6*a* associated with the escapement wheel 6*b*. The movement of the pawl from one position to the other releases a tooth of the wheel 6*b*, in the well-known manner, and consequently feeds the rotary switch one step forwards.

The rotary switch has as many banks (designed by 8*d*) as the code used for the transmission of the characters has units, i. e. elemental signals identifying the character and, in addition, two banks 14 and 4*c*, the functions of which will be explained hereinafter. The wiper arms of all these banks are on the same shaft which is controlled by 6 and therefore move together.

The banks 8*d* have the same even number of contacts and there are as many translating devices T*n* as there are contacts, i. e. messages transmitted, or which can be transmitted, simultaneously. Each translating device T*n* is connected to all the contacts of the same order of the banks 8*d* and its function is to give to each of the connection wires a + or − polarity. As stated, the whole of these polarised signals characterise the signal to be transmitted.

In short distance communication, it might happen that the next control frequency is received before the end of the rotation through one step thus produced. It is to avoid this drawback that the hold-on relay 4 has been provided. The winding of this relay is connected to one of the wiper arms 4*c* of the rotary switch. The contacts of the ring 4*d* corresponding to said arm are alternately (in even and odd numbers) connected to the fixed contacts 7*a* and 7*b* of a polarised relay 7 connected in parallel with the relay 3. The armature 7*c* of said relay 7 is grounded.

When the control frequency is received, the relay 7 is energized and its armature 7*c* changes position. It thus grounds the even numbered contacts, for example, of the ring 4d assuming that previously ground was connected to the odd numbered contacts (or conversely). The wiper arm 4c being at this instant on an even numbered contact, the relay 4 is energized and breaks at 4a—4b the circuit of the relays 3 and 7. In this manner, no fresh energization is possible for these relays until the end of the rotation. When this occurs, the wiper arm 4c touches the odd numbered contact which is not grounded, so that the relay 4 is released and the reception of the next control frequency becomes possible.

The apparatus described, which operates in this example according to the 5-unit Baudot code, comprises five groups of two relays 8 and 11 which are connected on the one hand to the control line 5 and on the other hand to ground (only two of these groups are shown). The relays 8 and 11 are therefore energized in one direction or in the other, according to the polarity to which the line 5 is connected.

In each group, the armature 8a is connected to a wiper arm 8d of the rotary switch. There are therefore five such wiper arms and five corresponding rings of contacts. The transmitters T$n$ are connected in parallel with the corresponding contacts of the different rings; for example, for the contacts of row $n$, the transmitter shown at T$n$ transmits (as will be described) the previously prepared combination of frequencies. The stationary contacts 8b and 8c cooperating with the armature 8a are respectively connected to the windings of two relays 9 and 10 connected in parallel, the other ends of said windings being grounded. The armatures 9a and 10a of these relays 9 and 10 are respectively connected to the fixed contacts 11a and 11b of the armature 11c of the relay 11, and the whole arrangement of relays 8 and 11 is such that, when the relay 9 is fed by the armature 8a, the armature 10a is connected to the armature 11c, while when on the contrary, the relay 10 is fed through the armature 8a, the armature 9a is connected to the armature 11c.

Thus while one combination is being recorded on the relays 9 the combination which had previously been recorded on the relays 10 is transmitted.

Finally, the reversal of the polarity of the control line 5 produces at the same time the reversal of the control of the identification or starting frequency by the relays 12a and 12b, the position of which is controlled by this polarity, their common point being connected to the line 5. These identification or starting frequencies are supplied by the generators 131 and 132 that are selected by the energization of the relays 12a and 12b, respectively.

Thus, at the instant when the control frequency is received at the transmitter by the receiver 156, this reception produces a rotation by one step of the rotary switch controlled by the pawl 6a and escapement 6b, the recording of the next combination to be transmitted, the transmission of the combination previously recorded, and the simultaneous transmission of the starting frequency. It is apparent that according to the polarity transmitted by the armature 11c, the relays 13 produce the transmission of one or the other of the signalling frequencies of the pair corresponding to the group considered. Each group of relays 13 is connected to select frequencies generated by a pair of generators such as 121 and 122, for example.

A special ring of contacts of the rotary switch, cooperating with the wiper 14, serves for the energization of the relays R$n$ which ground the electromagnets for transferring the transmitters to the level $(n+1)$, so that immediately after having operated, they may prepare the next combination. The rotary switch therefore has in all, in this example, seven levels of contacts. In the drawing, only two groups of relays 8 to 11 are shown, the three others being similar thereto.

It will therefore be seen that the relays R$n$ are connected to the contacts of wiper 14 with a shifting of one contact in the direction of the movement of the rotary switch. As soon as the relay R$n$ has released its armature, the translating device T$n$ prepares the next combination.

In the case of difficult communication, in order not to load the transmitter, which consists of the carrier generator 151, modulator 152 and amplifier 153, by supplying it with six frequencies simultaneously, plus a seventh for the control of the other channel, it is advantageous to interpose between the armatures 11c and the frequency control relays 13a and 13b a distributor rotating at an arbitrary speed which controls the transmission of the frequencies in any order. The speed of rotation of this distributor is obviously only limited by the width of the band-pass filters and the interval between the frequencies.

The relays 12a and 12b control the transmission of the starting frequency generated by the generators 131 and 132, the relays 13a and 13b those of the signalling frequencies supplied by generators such as 121 and 122. When the polarity of line 5 is such as to cause the relay 12a to cause its armature 12c to connect the generator 131 to the line 108 the identification or starting frequency supplied by the generator 131 is fed to the modulator 152 of the transmitter. On the other hand if the opposite polarity is supplied by the line 5 the relay 12b causes its armature 12d to connect the generator 132 to the line 108 so that the identification or starting frequency supplied by the generator 132 is connected to the line 108 to the modulator 152. The relays 13a and 13b function in a similar manner to connect the generators 121 and 122 through the line 106 to the modulator 152. These generators 121 and 122 generate frequencies which comprise the elementary signals and in the present example there are five groups of such generators, each consisting of two generators 121 and 122. Thus there are also five groups of relays 13a and 13b, one for each group of generators.

In accordance with usual telegraphic practice, the supply battery acting as a common source for the various circuits shown has its mid-point grounded. This is the case both in Figs. 1 and 2. The various leads connected in the drawing to positive or negative or to ground are therefore connected to the corresponding poles of the battery or to its mid-point.

*Receiving end (Fig. 2)*

Figure 2:
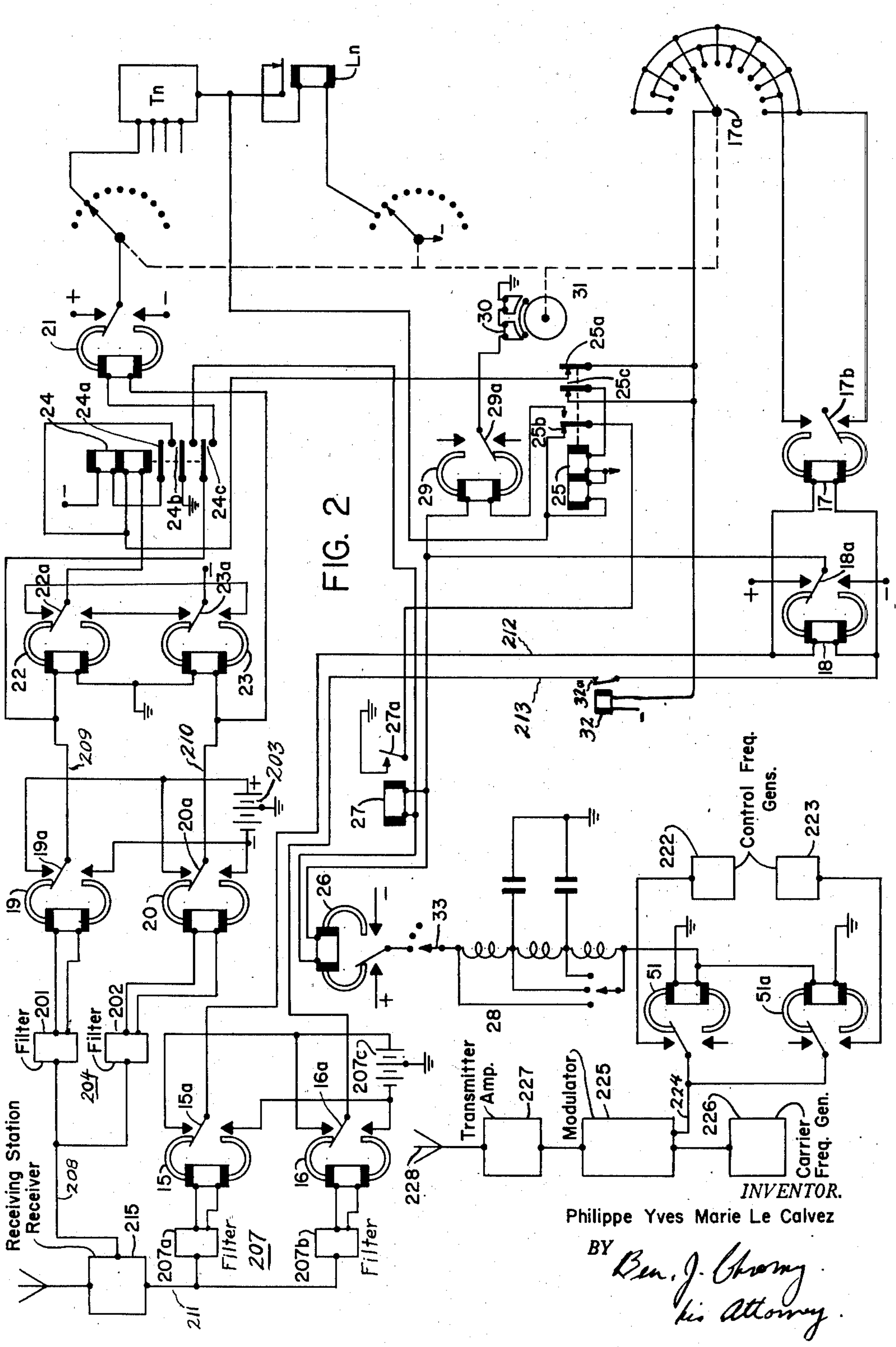
Fig. 2 is a schematic diagram of the receiving station.

The action at the receiving end will now be described with reference to Fig. 2.

The receiving station consists of an amplifier and detector receiving apparatus 215 connected to the antenna 214. The output of this apparatus is connected by way of the conductors 208 and 211 to the filter sets 204 and 207, respectively. Five groups of filter sets such as 204 are employed for selecting the frequencies used for transmitting the elemental signals. The filter set 207 which is connected to the apparatus 215 by the conductor 211 is employed for selecting the identification or starting frequency. Each of the filter sets 204 consist of a pair of filters 201 and 202 for selecting two different frequencies and the outputs of these filters are connected to energize the relays 19 and 20, respectively. The armatures of the relays 19*a* and 20*a* are connected to the conductors 209 and 210, respectively. A pair of contacts is associated with each of the armatures 19*a* and 20*a* and one contact of each of these pairs is connected to the positive terminal of the battery 203 and the other contact of each of these pairs is connected to the positive terminal of the battery 203. A central tap on this battery 203 is grounded. The filter set 207 is similar to the filter set 204. In the case of the filter set 207 there is provided a pair of filters 207*a* and 207*b* tuned to select the identification or starting frequencies. The outputs of the filters 207*a* and 207*b* are connected to energize the relays 15 and 16, respectively. These relays 15 and 16 are provided with armatures 15*a* and 16*a* and each of these armatures has associated herewith a pair of contacts, one of these contacts of each pair being connected to the negative terminal of the battery 207*c* and the other contacts of these pairs being connected to the positive terminal of this battery. A mid-tap of this battery is grounded. The armatures 15*a* and 16*a* are connected to the lines 212 and 213, respectively. The line 212 is connected to one side of the relays 17 and 18 and the line 213 is connected to the contact 32*a* of the relay 32 to the other side of the relays 17 and 18. It will therefore be seen that the receiving apparatus 125 after detection feeds a set of frequencies to a harmonic telegraph board for controlling various relays.

The starting frequency is received by one of the two relays shown at 15 and 16. The relays are arranged in a manner similar to that described with reference to the relays 1 and 2 which, in the transmitter, receive the control frequency, i. e. the armatures 15*a* and 16*a* are connected to the winding of a relay 17 and to that of a relay 18, while the fixed contacts 15*b*, 16*b* and 15*c*, 16*c*, are respectively connected to the two poles of the battery. In the normal position, no current therefore flows through the windings of the relays 18 and 17, because the armatures 15*a* and 16*a* are on contacts of the same polarity. Also no current flows if the two armatures become operative at the same time. It will, however, be obvious that a current of predetermined direction flows through said windings when only one of the armatures 15*a*—16*a* becomes operative. This arrangement is identical to the previous one and is for the same purpose.

The signalling frequencies are each received by one of the relays of a group of two, 19 and 20, in a similar manner to that described for the reception of the starting frequency. Consequently, in normal conditions of propagation, in each group of relays 19 and 20 only one of said relays is energized. It follows that the telegraph relay 21 indicates by the position of its armature 21*a* the direction of the current which is flowing through its windings, but remains insensitive to fading and to static. The combination is therefore recorded by the five relays such as 21.

With each relay 21 are associated three relays 22, 23 and 24. The relays 22 and 23 are respectively connected to ground and to the armatures 19*a* and 20*a* and are so arranged as to supply a predetermined polarity to the winding of the relay 24 when one of said two relays 22 or 23 is operative. Consequently, when one of said relays 22 or 23 is energized, and the relay 17 has grounded the even or odd contacts of the bank 17*a* which contact at that moment with the corresponding wiper arm (itself connected to the windings of the relays 24), the relay 24 is energized through the following circuit: battery, armature 23*a* (operative) armature 22*a* (inoperative), winding of the relay 24, dead contact 25*a* of the relay 25 (which will be described hereinafter), wiper arm 17*a*, armature 17*b* of 17 to ground. Use has been made, in this example, of two polarised relays 22—23 instead of a single non-polarised relay, for the purpose of speed of operation.

As the relay 24 is energized it closes a hold-on circuit for itself through the operative contact 24*a* and its second winding. It also closes a chain contact 24*b* and at 24*c* it opens the circuit of the relay 21 in order to prevent, as disclosed for contact 4*b* in the transmitter, the arrival of a fresh combination from disturbing the recording of the previous combination.

There are as many groups of relays 19—24 as there are units in the code employed. In the drawing only one group is shown. As shown in the figure, the contacts 24*b* of the *n* relays 24 are connected in series.

When the five chain contacts such as 24*b* are closed, the ground 24*c* is connected to the relays 26 and 27 in parallel. The windings of these two relays are connected to the armature 18*a* of the relay 18 which armature moves as soon as the starting frequency arrives. Consequently, the relays 26 and 27 are energized and the armature 26*a* of the relay 26 changes position. The fixed contacts of this armature are connected to the opposite poles of a supply battery of the circuit 28 controlling the transmission of the control frequency. This frequency is therefore immediately changed, thereby enabling, as previously explained, a fresh combination to be transmitted. The polarity supplied to the circuit 28 actuates one or the other of the relays 51 or 51*a* which control the modulation of the transmitter by means of one or the other of the control frequencies supplied by the generators 222 and 223 so that the carrier wave radiated by the transmitter transmitting in the opposite channel carries one or the other of these control frequencies. The transmitter consists of the modulator 225 connected to the carrier frequency generator 226 and to the amplifier 227 which in turn is connected to the antenna 228. The modulator 225 is also connected by the line 224 to the armatures of the relays 51 and 51*a*.

At the same time as one or the other of the relays 51 or 51*a* is energized through the circuit 28, the unpolarised relay 27 moves into its operative position and, through its operative contact 27*a* and the dead contact 25*b* of the relay 25 (which will be described hereinafter) grounds the electromagnets of the translating devices such as T'*n*. It will be obvious that only the translating device T'*n*, on the level of which the rotary switch is stopped, records the combination of the five relays 21.

The translating devices T'*n*, which may be of any form well-known per se, perform at the receiving end the reverse operation to that effected by T$n$ at the transmitting end.

The relays L$n$, after having caused the translating device T'$n$ to effect the desired reading, return it to its inoperative position so as to enable it to record again the next combination when the rotary switch has effected a complete revolution.

As soon as ground is connected to the armature 27$a$ (operative) the end relay 25 is excited through the following circuit: ground, operative contact 27$a$, inoperative contact 25$b$, winding of the relay 25 to battery. When energized, the relay 25 closes at 25$c$ the hold-on circuit for its second winding, from ground to the armature 17$b$, the contact of the bank 17$a$, and the corresponding wiper arm of the rotary switch. Ground which was put on by the contact 27$a$ (operative) is transferred by the operative contact 25$d$ to the feed relay 29, the armature 29$a$ of which, when it changes position, reverses the direction of the current flowing through the electro-magnet 30 for controlling the rotary switch 31. This switch is of the same type as before, i. e. with continuous drive and control by means of an escapement. Consequently the reversal of the direction of the current in the electromagnet 30 causes all the wiper arms to be fed one step forwards. At the same time, the opening of the contact 25$a$ has the effect of breaking the hold-on circuit of the relays 24 which become inoperative.

As soon as the rotation is completed, the ground put on by the armature 17$b$ is no longer on the contact 25$c$ since the rotary switch has moved one step forwards. Consequently, the relay 25 is no longer excited and becomes inoperative. The return of the relay 24 to the inoperative position also causes the relay 27 to return to the inoperative position, so that, as ground is no longer connected to 27$a$, the relay 25 remains inoperative.

During all these operations, the circuit of the relays 17 and 18 has remained open (in order to prevent any disturbance caused by the premature reception of a starting frequency) owing to the hold-on relay 32 which was energized by the ground put on by the armature 17$b$ and which held the contact 32$a$ open. This arrangement is advantageous for short distance communication in which the time of propagation may be less than the time for recording. At the end of a rotation, the ground from 17$b$ is eliminated, so that the relay 32 immediately becomes inoperative. Consequently, as soon as a new starting frequency arrives, the relays 17 and 18 move their armatures again.

The rotary switch is provided with a special bank of contacts for the control of relays such as L$n$, which energise at the level $n+1$ the reading electromagnet for the translating device T'$n$. The rotary switch therefore has a total of seven rings of contacts.

It will be noted that each of the relays 24 is actuated independently of its neighbours and is locked as soon as the corresponding modulation frequency is recorded by the relays 19—20. It follows therefore that the various groups of relays 19—20 can operate at different instants without reception being disturbed thereby. This protects the transmission from the effects of selective fading and furthermore enables, as mentioned hereinbefore the various modulation frequencies to be transmitted successively and not simultaneously, for example by means of a rotating distributor. Similarly, it will be readily understood that it is not necessary for the control frequency to be transmitted continuously; it is only necessary for it to be sent out as soon as the five relays 24 have operated.

The sending back of the control frequency is effected through the line 28 having an adjustable time constant, which enables the speed of the traffic to be varied. Also a three-way switch 33 stops the sending back of the control frequency thereby stopping the traffic, or allows it to be operated step by step for testing.

It will be seen that each element of the combination transmitted is received at a suitable instant and independently of the others. The system is therefore protected from total or selective fading and also from static. On the other hand, a fresh combination can only be registered if there has been a reversal of the starting frequency. Protection is therefore afforded from echo and other phenomena of the same nature e. g. lengthening of the signals.

The time—which elapses between two recordings is substantially equal to $$\theta=\frac{D}{150}+15 \text{ milliseconds}$$

where D is the distance in kilometres between two stations in radio communication. For a distance of 1,500 kilometres, for example, $\theta=25$ milliseconds, which provides a traffic of 400 words per minute on 12 channels, i. e. 33.3 words per minute per channel, which corresponds to the present average capacity of translating devices and transmitters. In this case, the rotary switches would have to rotate at 40 steps per second, which is perfectly feasible for apparatuses of the type indicated (pawl escapement type).

The telegraph speed on each frequency would be 40 bauds.

For a much longer distance, for example 15,000 km. $\theta=115$ milliseconds. In this case, the traffic would fall to 86 words per minute which could be distributed over only 3 channels. But the telegraph speed would only be 8.6 bauds; this would be a case in which it would be advantageous to use at the transmitting end a distributor as referred to hereinbefore, in order to transmit the frequencies successively and relieve the transmitter.

With frequencies of $(2m+1)$ 60 of harmonic telegraphy, the width of the band utilised is 2.1 kilocycles. It is therefore possible to place two similar systems side by side, and, on the assumption that the conditions of propagation are substantially the same on both, it is possible, if the same speed of traffic is accepted for each, to use only one control frequency and one starting frequency. The number of frequencies necessary for two systems would then be reduced to 24 and the band width would be 3.18 kilocycles. Finally, with a transmitter having a single side-band, it would be possible to have four similar systems with 22 separate frequencies, by sending the starting frequency and two groups on one side of the carrier and the control frequency and the two other groups on the other. The width of each side-band would only be 2.95 kilocycles, and it would be possible to send 1,600 words per minute over a distance of 1,500 kilometres.

In any case, the number of frequencies modulating the transmitter at each instant is constant, thus enabling the depth of modulation to be adjusted to a maximum enabling operation with very good efficiency to be achieved.

What I claim is:

1. A telegraphic transmission system in which signal elements are transmitted decomposed into a finite number of elementary characters, comprising a first transmitter for the transmission of the signal characters, means in said transmitter for transmitting an identification signal that identifies the signal character that is being transmitted at the same time as said signal character is transmitted, a receiving station for receiving said signal character and said identification signal, a second transmitter connected to said receiving station and controlled thereby for transmitting a control signal to said first transmitter indicating that the transmission of said signal character and the accompanying identification signal have been received at said receiving station, a receiver at said first transmitter for receiving said control signal, said last mentioned receiver having means for causing said first transmitter to transmit the next signal character and another and different identification signal when said control signal is received by said receiver from said second transmitter and means at said first transmitter to prevent the transmission of said next signal character and said other and different identification signal until said receiving station receives said first mentioned signal character and identification signal and said second transmitter transmits said control signal to said receiver at said first transmitter.

2. A telegraphic transmission system in which signal elements are transmitted decomposed into a finite number of elementary characters, comprising a first transmitter for the transmission of the signal characters, means in said transmitter for transmitting an identification signal that identifies the signal character that is being transmitted at the same time as said signal character is transmitted, means for alternately selecting said identification signal from a group of two frequencies, a receiving station for receiving said signal character and said identification signal, a monitor transmitter connected to said receiving station and controlled thereby for transmitting a control signal to said first transmitter indicating that the transmission of said signal character and the accompanying identification signal have been received at said receiving station, a receiver at said first transmitter for receiving said control signal, said last mentioned receiver having means for causing said first transmitter to transmit the next signal character and another identification signal when said control signal is received by said receiver from said monitor transmitter and means at said first transmitter to prevent the transmission of said next signal character and said other identification signal until said receiving station receives said first mentioned signal character and identification signal and said monitor transmitter transmits said control signal to said receiver at said first transmitter.

3. A telegraphic transmission system in which signal elements are transmitted decomposed into a finite number of elementary characters, comprising a first transmitter for the transmission of the signal characters, means in said transmitter for alternately transmitting an identification signal on one of a pair of frequencies that identifies the signal character that is being transmitted at approximately the same time as said signal character is transmitted, a receiving station for receiving said signal character and said identification signal, filter means in said receiving station for selecting the identification signal frequency, a monitor transmitter connected to said receiving station and controlled thereby for transmitting a control signal to said first transmitter indicating that the transmission of said signal character and the accompanying identification signal have been received at said receiving station, a receiver at said first transmitter for receiving said control signal, said last mentioned receiver having means for causing said first transmitter to transmit the next signal character and another identification signal on the other of said pair of frequencies when said last mentioned control signal is received by said receiver from said monitor transmitter and means at said first transmitter to prevent the transmission of said next signal character and said other identification signal until said receiving station receives said first mentioned signal character and identification signal and said monitor transmitter transmits said control signal to said receiver at said first transmitter.

4. In a duplex telegraph system, the combination of a transmitter including means for transmitting selectively a frequency from each pair of a double series of frequencies in accordance with a predetermined code to form a coded signal, means in said transmitter for sending out an identification signal accompanying each coded signal, means for alternately selecting the frequency of said identification signal from a group of two frequencies, a receiver, a monitor transmitter controlled by said receiver to return to said transmitter a control signal when said receiver has received said coded signal and said identification signal, means in said monitor transmitter for alternately selecting said control signal from a group of two frequencies, two operative circuits respectively at said transmitter and at said receiver, means for giving said operative circuits an alternate position and polarity for each successive coded signal through the action respectively of said control and said identification signals, said last means including a relay in said receiver and a relay in said transmitter respectively for controlling the polarity of the said operative circuits, a switch in series with each of said relays and additional relays controlling each of said switches and adapted to operate respectively under the action of the incoming identification or control signals of corresponding frequency of one of the said group of two frequencies.

5. A telegraphic transmission system in which signal elements are transmitted decomposed into a finite number of elementary characters, comprising a first transmitter for the transmission of the signal characters, means in said transmitter for transmitting an identification signal that identifies the signal character that is being transmitted substantially at the same time as said signal character is transmitted, means for alternately selecting said identification signal from a pair of two frequencies, a receiver at said first transmitter for receiving control signals for said transmitter, a receiving station for receiving said signal character and said identification signal, a monitor transmitter connected to said receiving station and controlled thereby for transmitting a control signal consisting of one of said pair of frequencies to said receiver at said first transmitter indicating that the transmission of said signal character and the accompanying identification signal have been received at said receiving station, and means at said first transmitter for causing said first transmitter to transmit the next signal character and another identification signal when said control signal is received thereby from said monitor transmitter.

6. A telegraphic transmission system in which signal elements are transmitted decomposed into a finite number of elementary characters, comprising a first transmitter for transmission of signal characters, said transmitter having a plurality of modulation frequency generators, a plurality of switches for selecting the modulation frequencies and a translating device for controlling said switches in accordance with the message to be transmitted, identifying modulating means for modulating said transmitter in accordance with identifying signals for identifying the signal character being transmitted, a control receiver for said transmitter, said control receiver having filters for selecting control signals, relays connected to each of said filters, a polarized circuit connected so that said relays control the polarity thereof, and means for controlling said identifying modulating means in accordance with the polarity of said polarized circuit.

7. A telegraphic transmission system in which signal elements are transmitted decomposed into a finite number of elementary characters, comprising a first transmitter for the transmission of the signal characters, means in said transmitter for transmitting an identification signal comprising one of a pair of frequencies that identifies the signal character that is being transmitted, a receiving station for receiving said signal character and said identification signal, said receiving station having a pair of filters for selecting said pair of frequencies, a monitor transmitter connected to said receiving station, means for alternately modulating said monitor transmitter in accordance with said pair of frequencies so that said frequencies are received as identification signals by said receiving station and transmitted by said monitor transmitter alternately as control signals to said first transmitter indicating that the transmission of said signal character and the accompanying identification signal have been received at said receiving station, a receiver at said first transmitter for receiving said control signal, said last mentioned receiver having means for causing said first transmitter to transmit the next signal character and another identification signal when said control signal is received by said receiver from said monitor transmitter and means at said first transmitter to prevent the transmission of said next signal character and said other identification signal until said receiving station receives said first mentioned signal character and identification signal and said monitor transmitter transmits said control signal to said receiver at said first transmitter.

8. A telegraphic transmission system in which signal elements are transmitted decomposed into a finite number of elementary characters, comprising a first transmitter for transmission of signal characters, said transmitter having a plurality of modulation frequency generators, a plurality of switches for selecting the modulation frequencies and a translating device for controlling said switches in accordance with the message to be transmitted, identifying modulating means for modulating said transmitter in accordance with identifying signals for identifying the signal character being transmitted, a control receiver for said transmitter, said control receiver having filters for selecting control signals, relays connected to each of said filters, a polarized circuit connected so that said relays control the polarity thereof, means for controlling said identifying modulating means in accordance with the polarity of said polarized circuit, a receiving station for receiving said signal characters and said identifying signals, said receiving station having filters for said identifying signals, relays connected to said filters, a polarized circuit connected to said last mentioned relays so that said last mentioned relays control the polarity thereof, and a monitor transmitter for transmitting control signals to said first transmitter in accordance with the polarity of said last mentioned polarized circuit.

9. A telegraphic transmission system in which signal elements are transmitted decomposed into a finite number of elementary characters, comprising a first transmitter for transmission of signal characters and identifying signals, said transmitter having a plurality of modulation frequency generators, a plurality of switches for selecting the modulation frequencies and a translating device for controlling said switches in accordance with the message to be transmitted, identifying signal modulating means for modulating said transmitter in accordance with a pair of frequencies for identifying the signal character being transmitted, a control receiver for said transmitter, said control receiver having filters for selecting control signals, relays connected to each of said filters, a polarized circuit connected so that said relays control the polarity thereof, means for controlling said identifying signal modulating means in accordance with the polarity of said polarized circuit to select one or the other of said pair of frequencies depending upon the polarity of said polarized circuit, a receiving station for receiving said signal characters and said identifying signals, means for determining which of said pair of frequencies was received with the last signal character received, and a monitor transmitter connected to said receiving station for sending a control signal consisting of the other of said pair of frequencies to said first transmitter to initiate the transmission of the next signal character.

PHILIPPE LE CALVEZ.

REFERENCES CITED

The following references are of record in the file of this patent:

UNITED STATES PATENTS

| Number | Name | Date |
|---|---|---|
| 2,235,755 | Bakker | Mar. 18, 1941 |